UNITED STATES PATENT OFFICE.

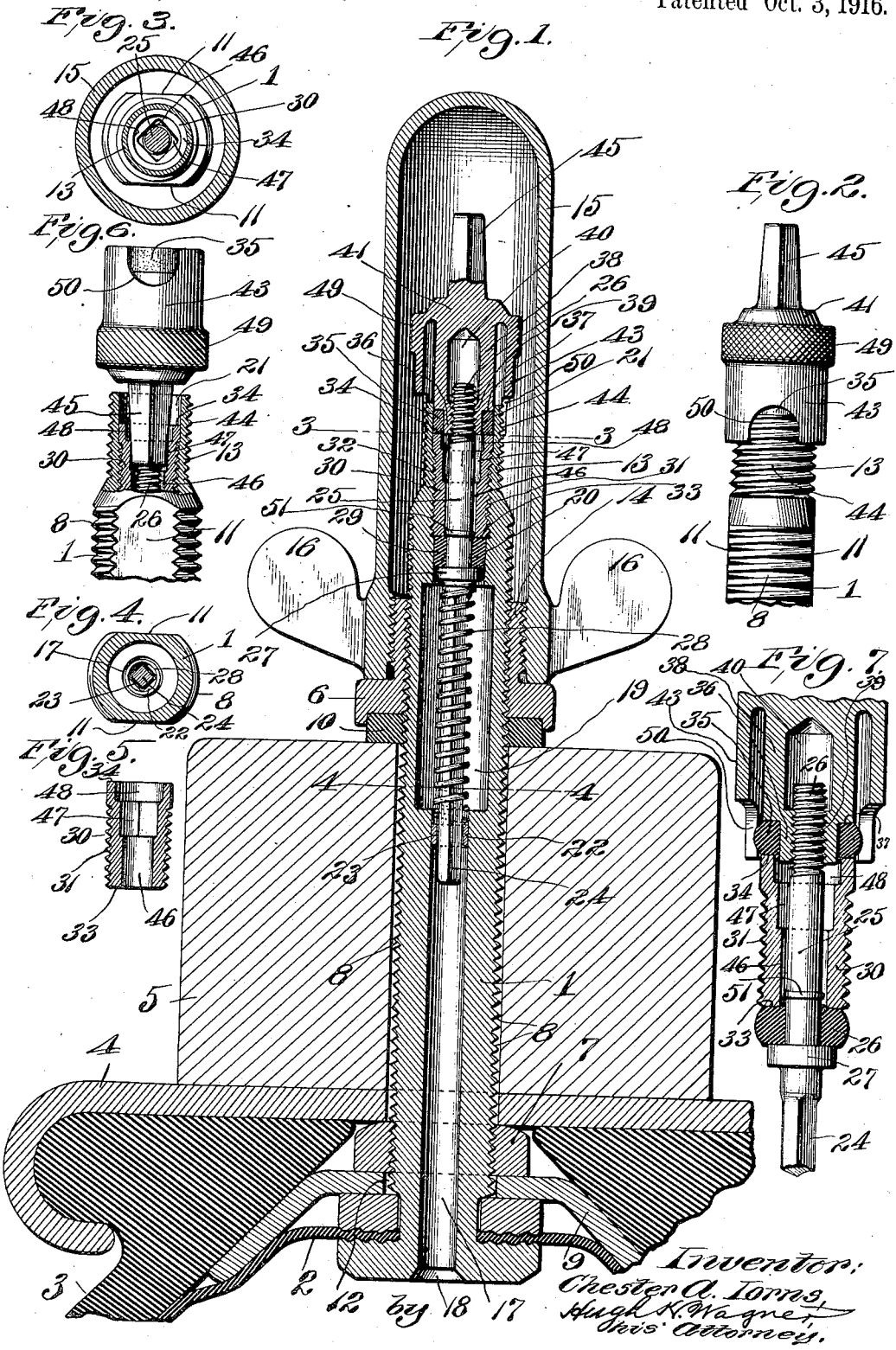

CHESTER A. IORNS, OF ST. LOUIS, MISSOURI.

VALVE.

1,200,358. Specification of Letters Patent. Patented Oct. 3, 1916.

Application filed September 7, 1915. Serial No. 49,244.

*To all whom it may concern:*

Be it known that I, CHESTER A. IORNS, a citizen of the United States, residing at the city of St. Louis, in the State of Missouri, have invented certain new and useful Improvements in Valves, of which the following is a specification.

This invention relates to valves and more particularly to a valve control for the passage communicating from without to a chamber or the like, adapted to be charged with a fluid under pressure, a well known chamber of the character mentioned being the inner tube of a pneumatic tire for automobile wheels.

The present invention has for its object to provide an automatic valve control of simple, cheap, and strong construction for said communicating passage of a chamber of the character described to prevent egress of the fluid under pressure with which said chamber is charged through said passage.

A further object is to provide a novel valve control of the character described having one or more valves which are adapted to seat simultaneously in relatively transverse directions.

Further, this invention consists in the combination and arrangement of parts set forth in this specification and pointed out in the claims.

An advantage of a valve control embodying the present invention is that its mechanism is simple, its operation effective and reliable for the purpose for which it is designed, and its parts comparatively few of strong construction and not readily damaged in use, thus avoiding the inconvenience and expense of frequent repair and replacement of parts.

Another advantage is that said valve control provides an efficient leak-proof closure against the egress of fluid under pressure contained in the charged chamber.

Other advantages of the valve control embodying the present invention are hereinafter pointed out in this specification.

In the accompanying drawings forming part of this specification wherein like numbers of reference denote like parts wherever they occur, Figure 1 is a vertical sectional view showing the valve control embodying the present invention and the parts associated therewith assembled in operative position and application in association with the pneumatic tire of a motor-vehicle wheel, said tire together with the wheel-rim and other adjacent parts being in fragmentary cross-sectional view; Fig. 2 is a fragmentary plan view showing a side elevation of the upper portion of the valve casing, said casing being turned on its axis substantially forty-five degrees to the right or left of the position thereof shown in Fig. 1; Fig. 3 is a view looking down upon a cross section on the line 3—3, Fig. 1; Fig. 4 is a view looking down upon a cross section on the line 4—4, Fig. 1; Fig. 5 is a longitudinal sectional view of the hollow sleeve having a valve seat at each end thereof, said sleeve being shown detached from parts associated therewith better to show the details of its construction; Fig. 6 is a view, partly in plan elevation and partly in vertical section, of the parts shown in Fig. 2, the tool of the removal cap being shown applied in operative position in the hollow sleeve and the valve chamber being turned substantially forty-five degrees to the right or left of the position thereof shown in Fig. 2; and Fig. 7 is a fragmentary detailed view on an enlarged scale showing a portion of Fig. 1 with the valve-stem, valves, hollow sleeve, and tool-bearing cap removed from association with the valve chamber, to illustrate diagrammatically the lateral distention of the valves under pressure of the shouldered member of the cap screwed in place upon the valve-stem.

For the purpose of convenient illustration, the valve control embodying the present invention is depicted in the accompanying drawings and is herein described in association with the usual perforated stem 1, which is adapted to communicate from without with inner tube 2 of pneumatic tire 3, said tire being of a well-known construction adapted for use on motor-vehicle wheels, the construction and arrangement of parts for operatively connecting the lower end of said stem with said tire and for fixing said stem in position to extend away from said tire through metallic rim 4 and felly 5 by any suitable means, such, for instance, as by means of nuts 6 and 7 operatively borne by external screw-threads 8 formed in the outer wall of stem 1, flanges 9 adjacent a portion of said tire, and gasket 10 intermediate nut 6 and felly 5, being, also, well-known and being clearly shown in Fig. 1 of the drawings.

The external outline of stem 1 may be that of a mutilated cylinder having one or more flat faces 11, best seen in Fig. 6, extending longitudinally of said stem to provide a well-known means to hold the stem fixed in the position shown in Fig. 1 against axial rotation or twisting, said face or faces being adapted to coöperate with adjacent portions of appropriately formed opening 12 in flanges 9 to prevent said axial rotation or twisting. The outer end of stem 1 may bear reduced tube or perforated nipple 13, said nipple being externally screw-threaded, as shown in the drawings, and being adapted to be removably connected with the charging nozzle (not shown) communicating with the source of air-supply (not shown) for inflating the tire.

Nut 6 may be provided with externally screw-threaded sleeve 14 adapted to receive the internally screw-threaded end of removable cap 15 of the usual construction, said cap being adapted as a removable outer casing for stem 1 and parts associated therewith for the well-known purpose of protecting same, wings 16 borne adjacent the base of said cap being adapted to provide a convenient means for manipulation in screwing and unscrewing same on screw-threaded sleeve 14.

Stem 1 may be provided with passage 17 having one end communicating with flared opening 18 at the base of said stem and having its other end communicating with an end of enlarged passage 19, the other end of said enlarged passage communicating with the adjacent end of passage 20, said passage 20 being adapted to communicate outwardly through bored nipple 13 with terminal opening 21 at the outer end of said nipple, the bore of said passage 20 being preferably relatively smaller than that of enlarged passage 19 and relatively larger than that of passage 17, said passages and hollow nipple 13 being adapted to form a continuous inclosed longitudinal channel through stem 1 and said nipple.

A perforated member 22 may be secured within said channel at a predetermined location therein suitable for the purposes of this invention between end-openings 21 and 18 and may be secured in place by any suitable means, such, for instance, as by means of being driven into passage 17 to the position therein shown in Fig. 1, said member being preferably a perforated disk, the perforation 23 thereof being square-shaped in cross section and being adapted to receive the squared extension 24 borne by valve-stem 25, said extension being adapted to be loosely slidable in said perforation, 23, the purpose of said perforated member being to receive extension 24 loosely slidable therethrough to lock valve-stem 25 against axial rotation, extension 24 fitting loosely in perforation 23 to provide spaces for the passage of fluid, such as air, to and fro between passages 17 and 19.

It is, of course, understood that the shape in cross-section of perforation 23 and of extension 24 is shown in the drawings as square merely by way of illustration and that any other suitable cross-sectional shape may be substituted, such, for instance, as the shape of any other polygonal figure, the purpose of perforated member 22 coöperating with extension 24 slidable loosely therein being, as stated above, to lock valve-stem 25 against axial rotation without forming a sealed closure against the passage of a fluid, such, for instance, as air to and fro between the portions of passage 17 adjacent opposite ends of member 22.

Valve-stem 25 is adapted to extend outwardly from the end of extension 24 attached thereto and may be adapted to have its screw-threaded end 26 protrude normally for a short distance beyond the outer end of nipple 13 through opening 21. The inner end of valve-stem 25 may be provided with a flange or collar 27 adjacent the attached end of extension 24, and a spiral spring 28 under tension may be mounted on said extension between said flange and member 22, said spring having one end adapted to bear upon said member and having its other end adapted to bear against said flange.

Valve 29 may be mounted on valve-stem 25 adjacent flange 27 and supported by said flange, said valve being a gasket of resilient material, such, for instance, as rubber.

Sleeve 30 is removably mounted in stem 1 with valve-stem 25 loosely slidable therethrough and said sleeve may be so mounted by being borne by the wall of passage 20 by means of screw-threads 31 and 32 formed in the outer wall of said sleeve and in the adjacent wall of said passage, one end of said sleeve being adapted to form a ring-shaped seat 33 for valve 29 and the other end of said sleeve being adapted to form a ring-shaped seat 34 for a second valve 35, said valve 35 being preferably a gasket made of resilient material, such, for instance, as rubber and being mounted on socketed valve-stem 36 adjacent shoulder 37 borne by said socketed valve-stem, enlarged portion 38 adjacent said shoulder being adapted slidably to enter nipple 13 through opening 21 as said socketed stem is screwed in place upon screw-threaded end 26 of valve-stem 25 by means of internally screw-threaded portion 39 of socket 40 to provide that valve 35 may be pressed firmly upon its seat 34 simultaneously with the seating of said valve laterally and with pressing of valve 29 firmly in the seat 33 and the distending of said valve laterally when said socketed valve-stem is screwed upon valve-stem 25. Enlarged portion 38 of said socketed valve-stem may be provided with a closed crown or head 41 adapted to extend laterally beyond the outside of nipple 13 and said crown may be provided with depending skirt 43 adapted to protect the external screw-threads 44 of said nipple. Crown 41 may, also, bear rigidly secured thereto or integrally formed therewith tool 45, the purpose of which tool and its details of construction being hereinafter more particularly described.

The details of construction of sleeve 30 are clearly shown in Fig. 5 wherein said sleeve is shown to be a tubular member open at both ends, communicating chambers 46, 47, and 48 being adapted to form the hollow portion thereof through which valve-stem 25 is adapted to pass in loosely slidable relation therewith, chamber 46 being a smooth walled circular bore extending inwardly from seat 33, chamber 48 being a smooth walled circular bore extending inwardly from seat 34, and chamber 47 being intermediate chambers 46 and 48 and being preferably square-shaped in transverse cross section, the bore of chamber 48 being sufficiently large to permit the reduced portion of socketed stem 36 to enter same as said socketed stem is screwed upon screw-threaded end 26 of valve-stem 25. External screw-threads of sleeve 30 are adapted to extend from adjacent seat 33 to a distance away from seat 34, the outer wall of said sleeve from the termination of said screw-threads to said seat 34 being blank and smooth as clearly shown in the drawings, said smooth wall of said sleeve being adapted to fit snugly against an adjacent smooth wall of passage 20, said smooth wall in passage 20 extending from opening 21 of nipple 13 to the beginning of screw-threads 32 in said passage, said screw-threads 32 terminating at a predetermined distance from the other end of said passage 20, the remaining portion of the wall of said passage from the termination of said screw-threads 32 to enlarged passage 19 being smooth to provide a smooth lateral seat for valve 29 when said valve is seated on its ring-shaped seat 33 and to provide a smooth surface against which said valve may slide when same is being moved to and from its said circular seat. Sleeve 30 may be screwed into place in passage 20 by means of inserting tool 45, which is square-shaped in cross-sectional view and is adapted to fit into the correspondingly square-shaped chamber 47 of sleeve 30, into said chamber 47 and thereby turning said sleeve after the screw-threaded end 26 of valve-stem 25 has been depressed, by means of said tool, inwardly beyond said chamber 47 or at least sufficiently far inwardly to permit said tool to engage in said chamber, until said sleeve is screwed in place in the position shown in Fig. 1 and Fig. 6, wherein the seat 34 is within nipple 13 sufficiently far away from opening 21 of said nipple to provide that when valve 35 is seated on said seat 34 said valve will, also, be entirely within said nipple and will seat laterally against the smooth wall of the portion of passage 20 between said seat and opening 21 of said nipple.

It is, of course, understood that the cross-sectional shapes of tool 45 and chamber 47 are shown to be square in the drawings merely by way of illustration and that any other suitable polygonal shapes may be substituted in constructing these parts. Also, for convenience to provide for the enlargement of chamber 47 and of the wear on tool 45 through frequent use in screwing and unscrewing sleeve 30, said tool may be tapered slightly from its base adjacent crown 41 to its end, as shown in the drawings.

A convenient method of assembling the parts embodying the valve control of the present invention and of associating said valve control operatively with the perforated stem 1 may consist in driving disk 22 into passage 17 to the position therein shown in Fig. 1, then mounting spring 28 on extension 24 of valve-stem 25, mounting valve 29 on said valve-stem adjacent flange or collar 27 and inserting said parts into stem 1 through opening 21 and then slipping sleeve 30 over the screw-threaded end of valve-stem 25, applying tool 45 to said sleeve and screwing same home to the position shown in said Fig. 1. These parts being thus assembled in stem 1, valve 29 normally will be held at least lightly seated on its seat 33 under compression of spring 28 even though tire 3 is in deflated condition and no air under pressure therefrom exerts force against said valve. The tire may now be inflated by means of the usual charging nozzle (not shown) communicating with the source of the supply of air under pressure, said nozzle being attached removably to nipple 13 and the valve mechanism (not shown) controlling the flow of air through said nozzle being opened the air will rush into stem 1 and will unseat valve 29 moving same into enlarged chamber 19, the entering air passing through nipple 13 and sleeve 30 along the spaces adjacent valve-stem 25 to said enlarged chamber, thence through perforation 23 of disk 22 along the spaces adjacent valve-stem extension 24 through passage 17 and thence through flared opening 18 into inner tube 2. When the tire has been inflated sufficiently, the air-supply from the charging nozzle may be cut off and said nozzle removed from nipple 13. The pressure of air against valve 29 from the inflated tire will seat said valve firmly upon its seat 33 and will, also, somewhat distend said valve to seat same laterally against the adjacent smooth wall portion of passage 20 and will generally seal all passages adjacent said valve against the escape of air therethrough from the inflated tire. In order further to provide against leakage of air through stem 1, socketed valve-stem 36 bearing valve 35 may now be screwed into place upon screw-threaded end 26 of valve-stem 25 to seat said valve 35 on its seat 34 and, as said socketed valve-stem is screwed home upon said threaded end 26 drawing valves 29 and 35 to seat tightly in their seats 33 and 34, respectively, under great pressure, said pressure will cause said valves to distend laterally to seat tightly against the smooth wall portions adjacent each end of sleeve 30 and generally will cause said valves to distend to seal all passages adjacent thereto very securely against leakage of air from the tire through stem 1, the coöperation of the end of stem-extension 24 with perforation 23 of disk 22 preventing valve-stem 25 from rotating axially when socketed valve-stem 36 is being screwed in place on threaded end 26 of stem 25, and the knurled or roughened band 49 borne by the outer wall of skirt 43 providing a convenient grasping means for screwing said socketed valve-stem into position upon threaded end 26.

The large cap 15 may now be screwed in place in the position shown in Fig. 1 to protect the parts covered thereby.

The smooth wall portions in passage 20 adjacent valves 29 and 35 seated against same and the smooth bores of chambers 46 and 48 of sleeves 30 protect said valves against wear and tear when seated on their seat and when they are being moved to and from seated position, thus providing a valve control of great durability requiring a minimum of repair. Should said valves become defective through long use or for any other reason, and leakage of air result therefrom, a quick temporary repair may be made by removing socketed stem 36 with its valve 35 from threaded end 26, and, having taken off the defective gasket forming valve 35, a new perfect gasket may be substituted and the parts quickly again screwed into place, skirt 43 being preferably provided with cut-out portions 50, two opposite cut-out portions being a convenient arrangement, to provide free access for the finger and thumb of the operator or for some appropriate tool to facilitate the operation of removing and replacing the gasket forming valve 35 on socketed stem 36. The permanent repair of the valves may then be undertaken at a time when it may be convenient to remove sleeve 30 by means of tool 45 and substitute a perfect gasket for the defective one of valve 29, also.

It may be observed that in the valve mechanism of the present invention it is not necessary that the gaskets forming valves 29 and 35 fit snugly around their respective valve-stems, but that they may fit loosely for, under the great pressure of socketed stem 36 screwed upon threaded end 26, the resilient material, such, for instance, as rubber of which said valves are composed will be distended to span and seal perfectly all interstices adjacent thereto against the passage of air therethrough.

It is, of course, understood that the valve control embodying the present invention may be applied to control the outwardly communicating passage not only of a chamber or the like adapted to be charged therethrough with a fluid under pressure, but may, also, be applied to such a passage of a chamber, vessel, or the like adapted to hold liquid under pressure or fluid not under pressure, and, further, said valve control may be applied to seal the outwardly communicating passage of a chamber, vessel, or the like adapted to contain highly volatile substances.

Bead 51 borne by valve-stem 25 may be provided to insure the unseating of valve 29 when said stem is depressed, said bead being adapted to engage adjacent portions of said valve so that in case said valve should, for any reason, adhere to seat 33 or the adjacent wall of passage 20, said bead will detach said adhering valve and unseat same as valve-stem 25 is moved inwardly.

Many changes in the construction and arrangement and combination of parts may be made without departing from the nature and spirit of the present invention.

I claim:

1. A valve-control consisting of valve-mechanism operatively mounted in a casing therefor, said mechanism comprising a pair of resilient valves, a hollow member mounted in said casing intermediate said valves and having a valve-seat at each end, said member being open at both ends, and screw-threaded means extending through said hollow member adapted adjustably to connect said valves and adapted, also, to coöperate with said hollow member to press said valves on said seats and to distend said valves under pressure laterally against the adjacent inner wall of said casing.

2. In a valve-control, a casing inclosing a passage, said passage being constructed to communicate inwardly with a container and having an outer port and an enlarged portion, a hollow member mounted in said casing, a stem slidably mounted in said hollow member, a valve mounted on said stem, said valve being constructed to seat on one end of said hollow member and to unseat into said enlarged portion, a screw-threaded member removably borne by said stem, a second valve borne by said member and adapted to seat on the other end of said hollow member, said screw-threaded member being constructed to coöperate with said hollow member to seat said valves under pressure as said member is screwed toward said hollow member, and means within said casing constructed to lock said stem against axial rotation.

3. In a valve-control, a casing inclosing a passage, said passage being adapted to communicate inwardly with a container and having an outer port, a hollow member mounted in said casing, said hollow member being open at both ends, a stem slidably mounted in said hollow member, a flange borne by said stem, a resilient member mounted on said stem adjacent said flange, said resilient member being adapted to seat on one end of said hollow member, a screw-threaded member removably borne by said stem, a flange borne by said member, a second resilient member mounted on said screw threaded member adjacent said last-named flange, said second resilient member being adapted to seat on the other end of said hollow member, said screw-threaded member being adapted to coöperate with said hollow member to press said resilient members between their respective flanges and the adjacent end of said hollow member, and, also, to distend said resilient members laterally to seat on the adjacent wall of said passage, and means within said casing adapted to lock said stem against axial rotation.

4. A valve control consisting of valve mechanism operatively mounted in a casing therefor, said casing consisting of a tube internally screw-threaded, said mechanism comprising a pair of resilient valves, a hollow member open at both ends mounted in the screw-threaded portion of said casing intermediate said valves and having a valve seat at each end, and screw-threaded means extending through said hollow member adapted adjustably to connect said valves and adapted, also, to coöperate with said hollow member to press said valves on said seats and to distend said valves under pressure laterally against the adjacent inner wall of said casing.

In testimony whereof I hereunto affix my signature.

CHESTER A. IORNS.